(12) United States Patent
Hanagan

(10) Patent No.: US 7,290,632 B2
(45) Date of Patent: Nov. 6, 2007

(54) MOTORCYCLE SEAT WITH INTEGRATED LOCK

(75) Inventor: Michael W. Hanagan, Hollister, CA (US)

(73) Assignee: Corbin Pacific, Inc., Hollister, CA (US)

( * ) Notice: Subject to any disclaimer, the term of this patent is extended or adjusted under 35 U.S.C. 154(b) by 469 days.

(21) Appl. No.: 11/042,554

(22) Filed: Jan. 24, 2005

(65) Prior Publication Data

US 2006/0081408 A1    Apr. 20, 2006

Related U.S. Application Data

(63) Continuation-in-part of application No. 10/965,533, filed on Oct. 14, 2004, now Pat. No. 6,971,714.

(51) Int. Cl.
   *B62K 11/00* (2006.01)

(52) U.S. Cl. .......... 180/219; 297/195.13; 224/413; 224/430

(58) Field of Classification Search ........... 297/215.12, 297/195.13, 188.1, 188; 224/413, 423, 430, 224/431, 435; 180/219; 296/78.1
   See application file for complete search history.

(56) References Cited

U.S. PATENT DOCUMENTS

| | | | |
|---|---|---|---|
| 3,779,597 A * | 12/1973 | Uchida | ............. 296/37.15 |
| 3,822,917 A | 7/1974 | George | |
| 3,913,974 A | 10/1975 | Bowen | |
| 4,171,731 A * | 10/1979 | Hilber | ................. 180/219 |
| 4,257,544 A | 3/1981 | Dierkes | |
| 4,266,703 A | 5/1981 | Litz | |
| 4,501,384 A * | 2/1985 | Itoh | ..................... 224/435 |
| 4,576,411 A | 3/1986 | Kitamura | |
| 4,629,201 A | 12/1986 | Tsukiji | |
| 4,932,101 A | 6/1990 | Lualdi | |
| 4,953,259 A | 9/1990 | Frye et al. | |
| 4,953,911 A | 9/1990 | Hanagan | |
| 5,107,949 A * | 4/1992 | Gotoh et al. | ........... 180/219 |
| 5,127,560 A | 7/1992 | Miyamoto et al. | |
| 5,147,077 A | 9/1992 | Nakajima et al. | |
| 5,533,783 A | 7/1996 | Harms et al. | |
| 5,558,260 A * | 9/1996 | Reichert | ................. 224/413 |
| 5,926,917 A | 7/1999 | Gantz | |
| 5,931,360 A | 8/1999 | Reichert | |
| 5,997,088 A | 12/1999 | Stark et al. | |
| 6,224,081 B1 | 5/2001 | Wayman et al. | |
| 6,237,710 B1 | 5/2001 | Mori et al. | |
| 6,354,476 B1 | 3/2002 | Alderman | |
| 6,484,914 B1 * | 11/2002 | Willey | ................... 224/413 |

(Continued)

*Primary Examiner*—Lesley D. Morris
*Assistant Examiner*—Maurice Williams

(57) ABSTRACT

A motorcycle has a frame, a structure mounted on the frame, and a locking assembly locks the structure on the frame and has a latch pin mounted on the frame, and a latch housing mounted on the structure and having a passage into which the latch pin extends. A latch lever is pivotably mounted in the housing for movement into a latching position in which it engages the latch pin to prevent its retraction from the latch housing, and a spring biases the latch lever into the latching position. A key lock is mounted on the exterior of the structure and including a rotatable shaft and an arm or cable connected thereto engages the latch lever to effect its pivoting against the biasing action of the biasing means to disengage the latch lever from the latch pin and permit the structure to be disengaged from the latch pin.

17 Claims, 7 Drawing Sheets

U.S. PATENT DOCUMENTS

| | | |
|---|---|---|
| 6,497,300 B2 | 12/2002 | Mori et al. |
| 6,568,699 B2 | 5/2003 | McCann |
| 6,581,243 B2 | 6/2003 | Parizel |
| 6,595,033 B1 | 7/2003 | Hara et al. |
| 6,623,071 B2 | 9/2003 | Kawamoto et al. |
| 6,860,359 B2 * | 3/2005 | Tanabe et al. .............. 180/309 |
| 7,028,800 B2 * | 4/2006 | Yagisawa et al. ........... 180/219 |
| 2003/0112633 A1 * | 6/2003 | Takeuchi et al. ............ 362/487 |

* cited by examiner

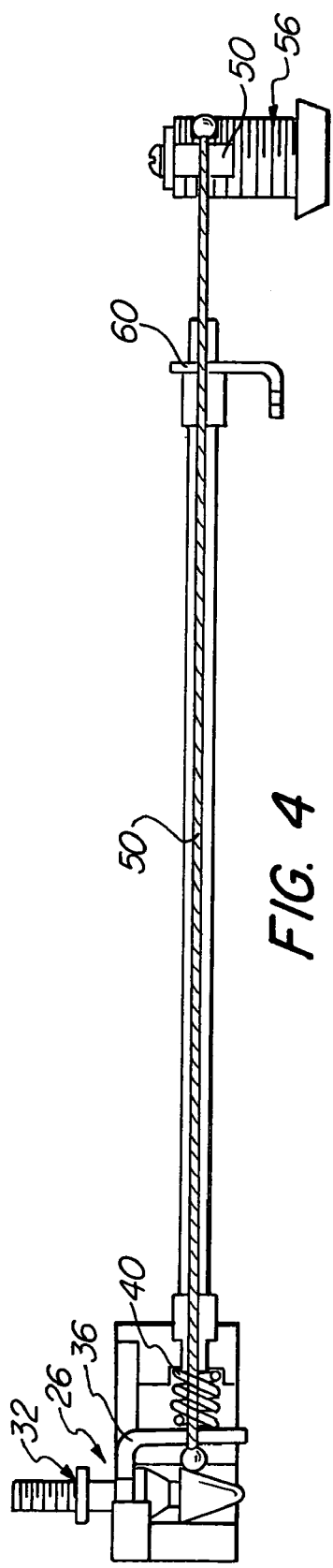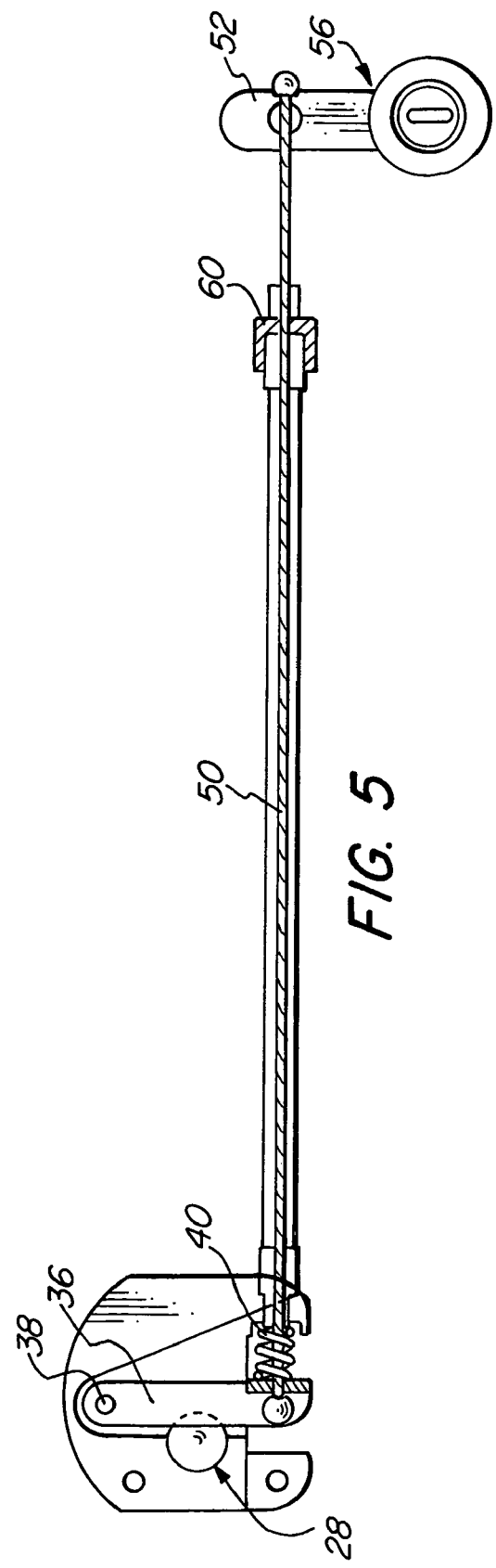

MOTORCYCLE SEAT WITH INTEGRATED LOCK

CROSS REFERENCE TO RELATED APPLICATION

The present application is a continuation-in-part of application Ser. No. 10/965,533, filed Oct. 14, 2004, now U.S. Pat. No. 6,971,714 and entitled Motorcycle Seat with Convertible Backrest.

BACKGROUND OF THE INVENTION

The present invention relates to motorcycle seats and storage units which are releasably engaged on the frame.

Motorcycle seats and saddle bags and other storage structures are secured to the motorcycle frame in various ways which generally include fasteners of various types. Because the driver generally requires access to components below the seat or storage device, the mounted structure may be unfastened and stolen. Accordingly, some motorcycles have locking mechanisms to preclude unauthorized removal. However, most locking mechanisms require installation at the factory and retrofitting of installed seats or storage devices can be difficult.

It is an object of the present invention to provide a novel motorcycle seat or other removable structure which is securely supported on and locked to the frame.

It is also an object to provide such a motorcycle seat or other structure accessory in which the latch pin of the locking mechanism is mounted on the frame.

Another object is to provide such a motorcycle seat or structure in which the latch and key components are readily incorporated into the seat or structure.

Another object is to provide a readily and economically fabricated locking assembly which can be installed on existing seats and storage structures.

SUMMARY OF THE INVENTION

It has now been found that the foregoing and related objects may be readily attained in a seat or other structure mounted on the frame and a locking assembly for locking the structure on the frame. The assembly includes a latch pin mounted on the motorcycle frame, and a latch housing mounted on the structure and having a passage into which the latch pin extends. A latch lever is pivotably mounted in the housing and is pivotable into a latching position in which it engages the latch pin to prevent its retraction from the latch housing, and biasing means biases the latch lever into the latching position. A key lock is mounted on the exterior of the structure and includes a rotatable shaft and a latch lever engaging means on the shaft which is engageable with the latch lever to effect its pivoting against the biasing action of the biasing means to disengage the latch lever from the latch pin and permit the structure to be disengaged from the latch pin.

In its principal application, the structure in which the locking assembly is installed is a motorcycle seat having a base or platform with a lower surface upon which the latch housing is mounted. The seat is usually pivotably mounted on the frame to provide access to components therebelow and the locking assembly prevents such pivoting.

In another embodiment, the structure is a storage unit having a base wall with a lower surface on which the latch housing is mounted. The latch pin is similarly mounted on the frame.

Generally, the latch pin has a shoulder in its circumference and the latch lever engages below the shoulder in the latching position to preclude retraction. In its preferred form, the latch pin desirably has two frustoconical portions spaced along its axial length which provide a pair of shoulders under each of which the latching lever is engageable. Usually, the biasing means is a compression spring acting against the latching lever at a point spaced from the axis of pivoting.

The key lock has a housing in which the shaft is rotatable and a portion on an exterior surface of the structure containing a key receiving recess for rotation of the shaft between locked and unlatching positions.

In one embodiment, the lever is pivotably mounted adjacent one end and the latch lever engaging means includes a cable connected to the other end of the latch lever. The cable is attached to the shaft so that rotation of the shaft by the key causes the cable to pivot the latch lever in the direction opposite the biasing action of the biasing means.

In another embodiment, the lever is pivotably mounted adjacent one end and the latch lever engaging means is an arm mounted on the shaft for rotation therewith, and the arm engages the other end of the latch lever to effect its pivoting in the direction opposite against the biasing action of the biasing means.

BRIEF DESCRIPTION OF THE DRAWINGS

FIG. 4 is a schematic view of the locking components in the locked position;

FIG. 5 is a similar view of the components rotated 90°;

DETAILED DESCRIPTION OF THE ILLUSTRATED EMBODIMENT

Figure 1:
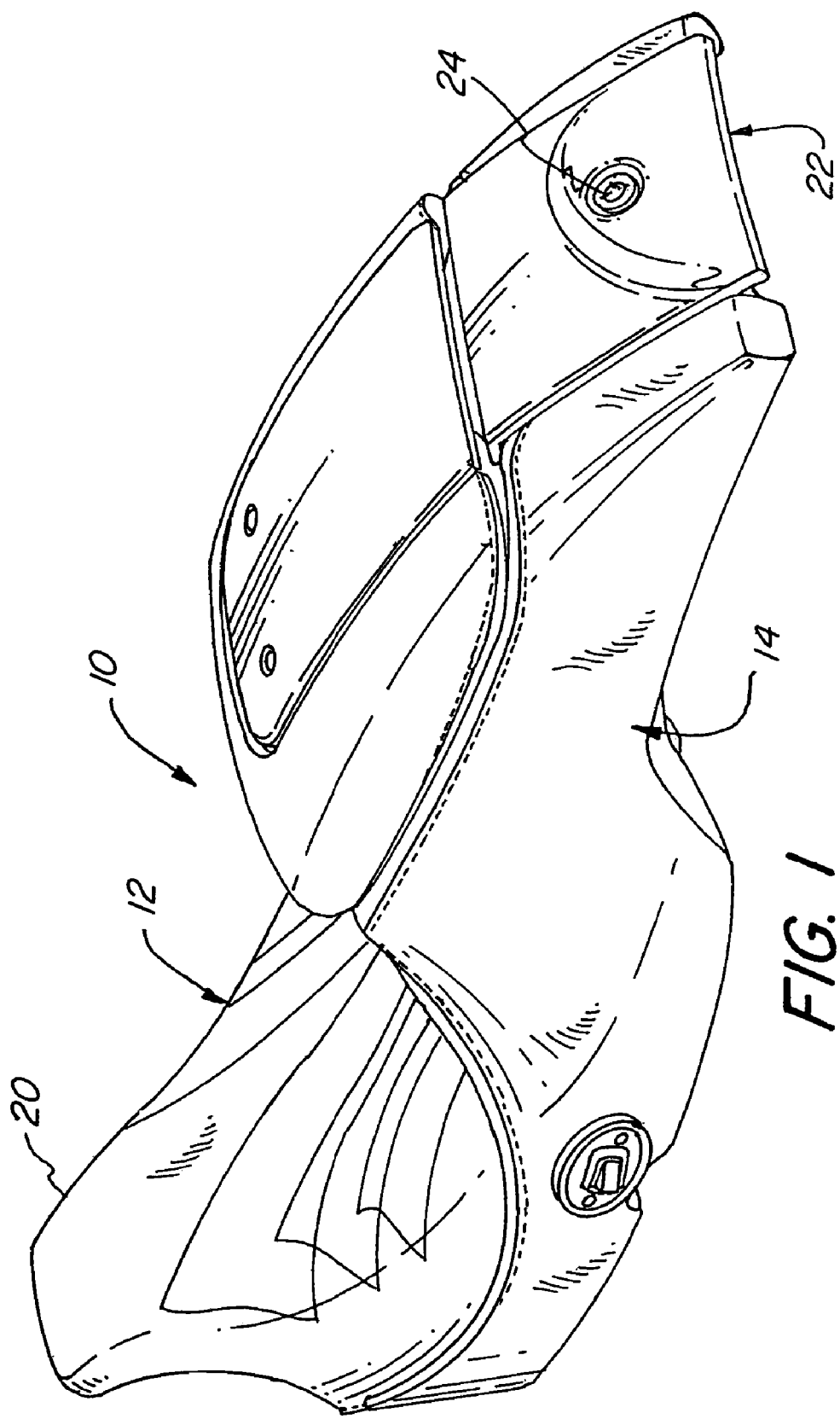
FIG. 1 is a perspective view of a motorcycle seat in which a locking assembly embodying the present invention is installed.

Turning first to FIG. 1, a motorcycle seat generally designated by the numeral 10 includes a driver seat portion generally designated by the numeral 12 at the front end thereof and a passenger seat portion generally designated by the numeral 14 at the rear end thereof. Adjacent the rear thereof is a backrest generally designated by the numeral 16, which is pivotable between the closed or inoperative position seen in FIG. 1 where it extends over the passenger seat portion 14 and an erect position. The motorcycle seat 10 includes an underlying platform or base 18 (seen in FIG. 2) which is secured to the chassis (not shown) of the motorcycle. On the platform 18 is cushioning material (not shown), and a cover 20 of leather and/or other suitable material extends over the entire exposed top and side surfaces of the motorcycle seat 10 and is secured to the lower surface of the platform 18. At the rear of the seat 10 is a cover plate 22 in which is mounted the key receiving portion 24 of the key lock of the present invention.

The seat 10 may be pivotally mounted on the chassis by hinges along one side (not shown) or secured in a fixed position by removable fasteners (not shown). The pivotal mounting provides easy access to motorcycle components below the seat. The lock assembly of the present invention precludes such pivoting and thus restricts removal and theft of the seat and access to the underlying components.

Turning in detail to FIGS. 2-5, a latch housing generally designated by the numeral 26 is secured in a recess 28 of the platform 18 by fasteners 30. Mounted on the motorcycle chassis (not shown) is the latch pin generally designated by the numeral 32 which extends into the passage 34 in the housing 26. A latch lever 36 is pivotally mounted on the pivot pin 38 in the housing 26 of the latch, and the spring 40 biases the latch lever 36 to engage the collars or shoulders 42, 44 provided by the frustoconical portions 46, 48 on the latch pin 32.

Figure 2:
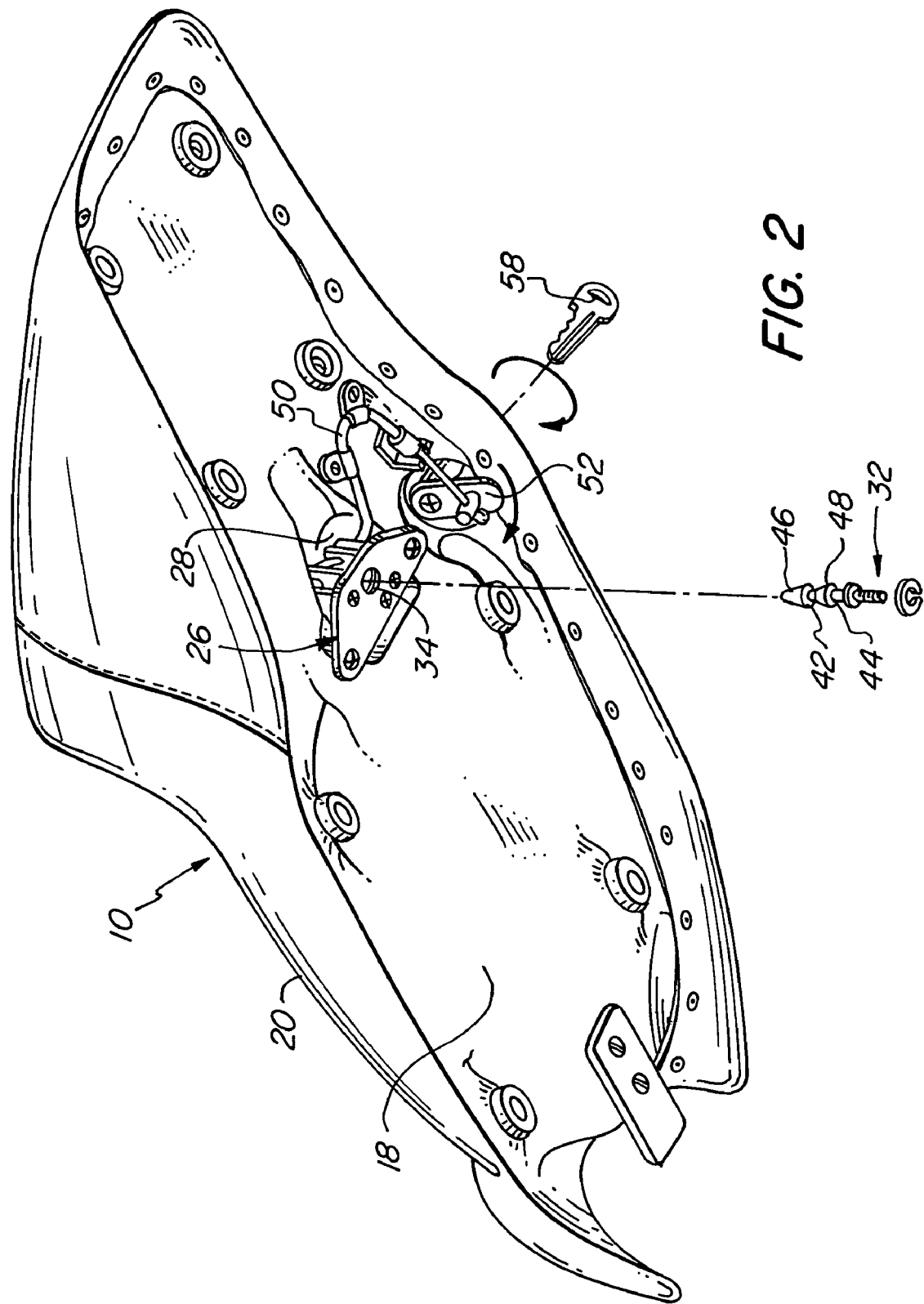
FIG. 2 is a bottom view of the seat of FIG. 1 showing a first embodiment of the locking assembly.
Figure 3:
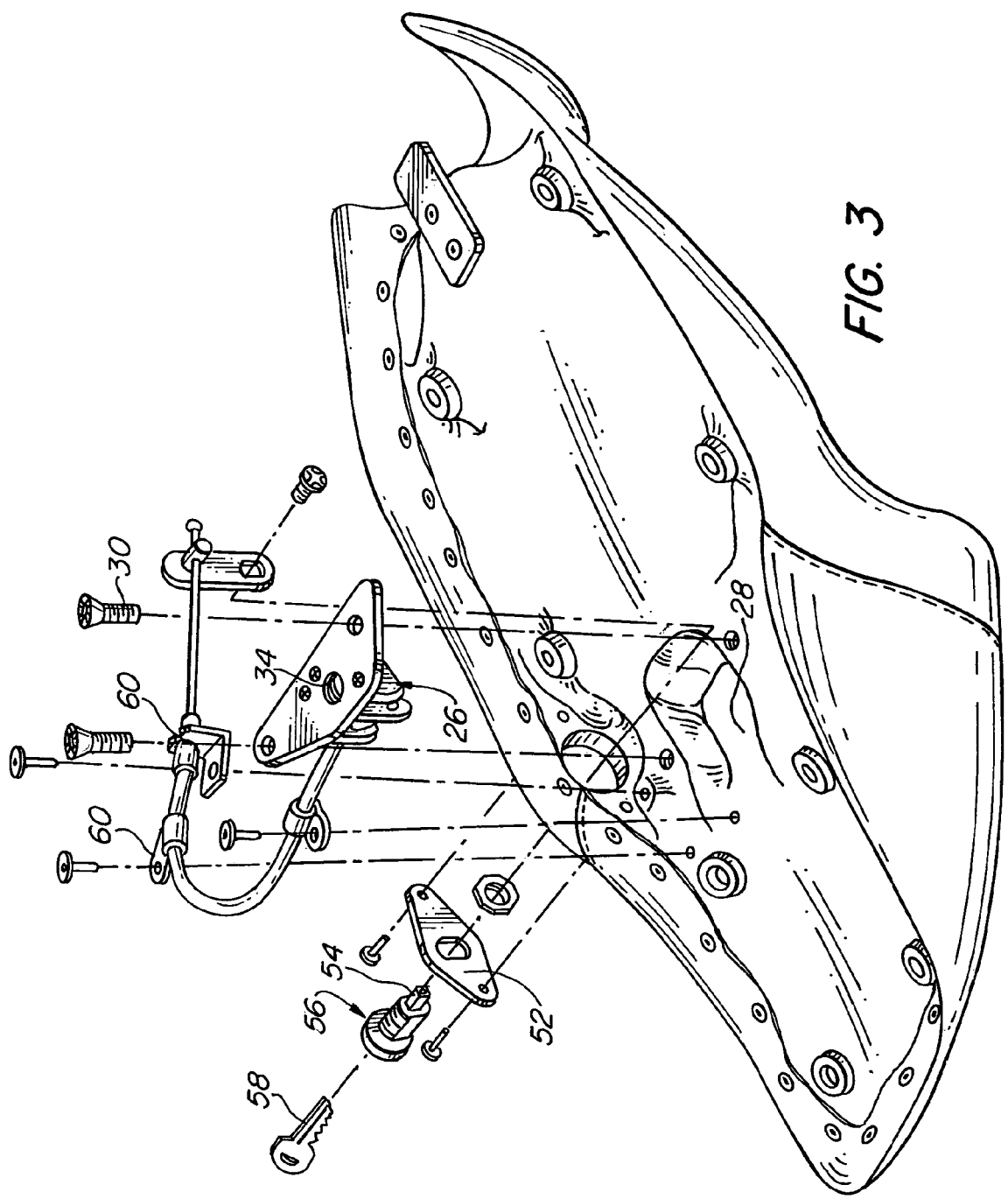
FIG. 3 is a similar partially exploded view of the components in FIG. 2.
Figure 6:
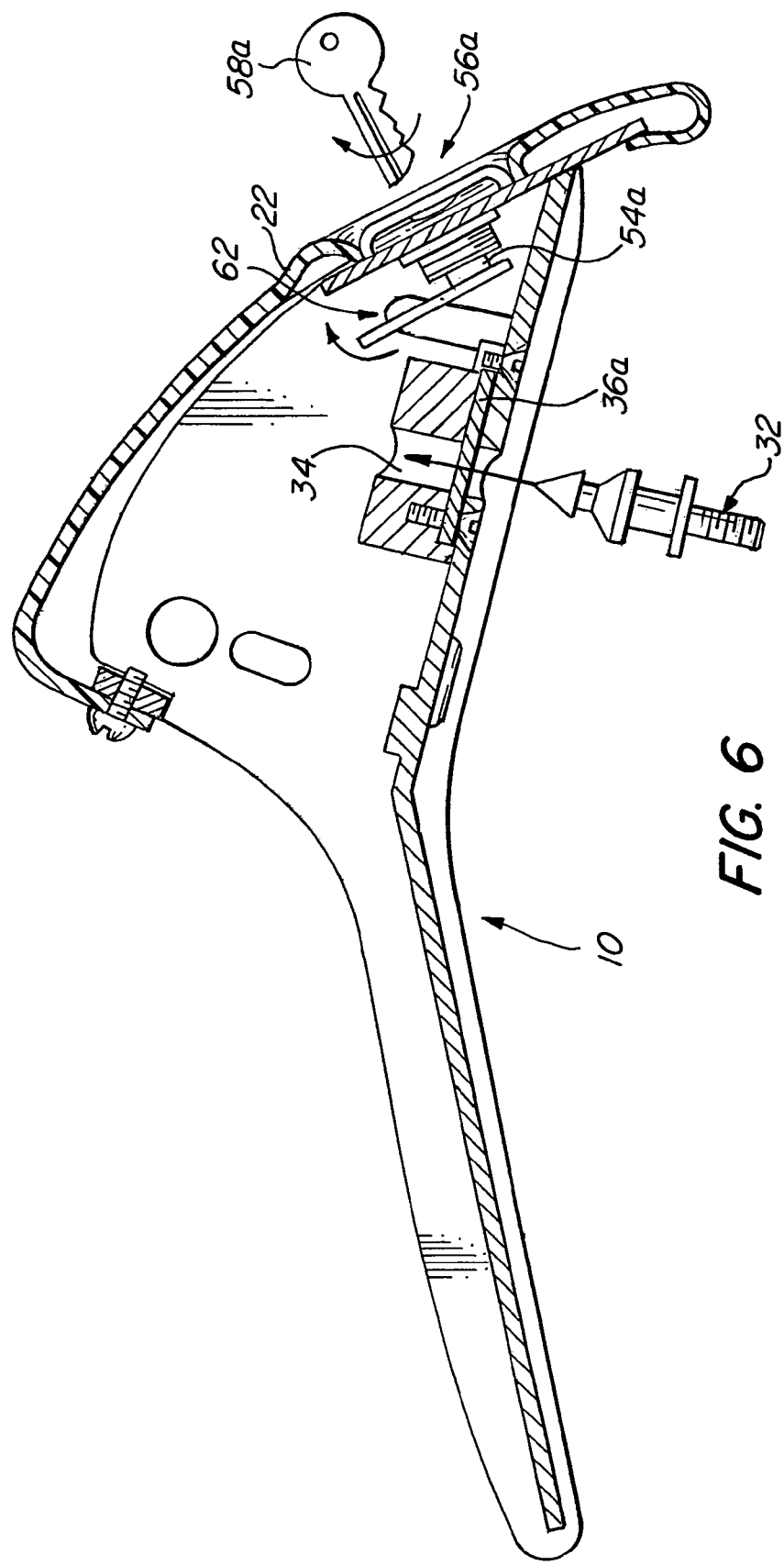
FIG. 6 is a fragmentary sectional view of the seat in which another embodiment of the locking assembly is installed.
Figure 7:
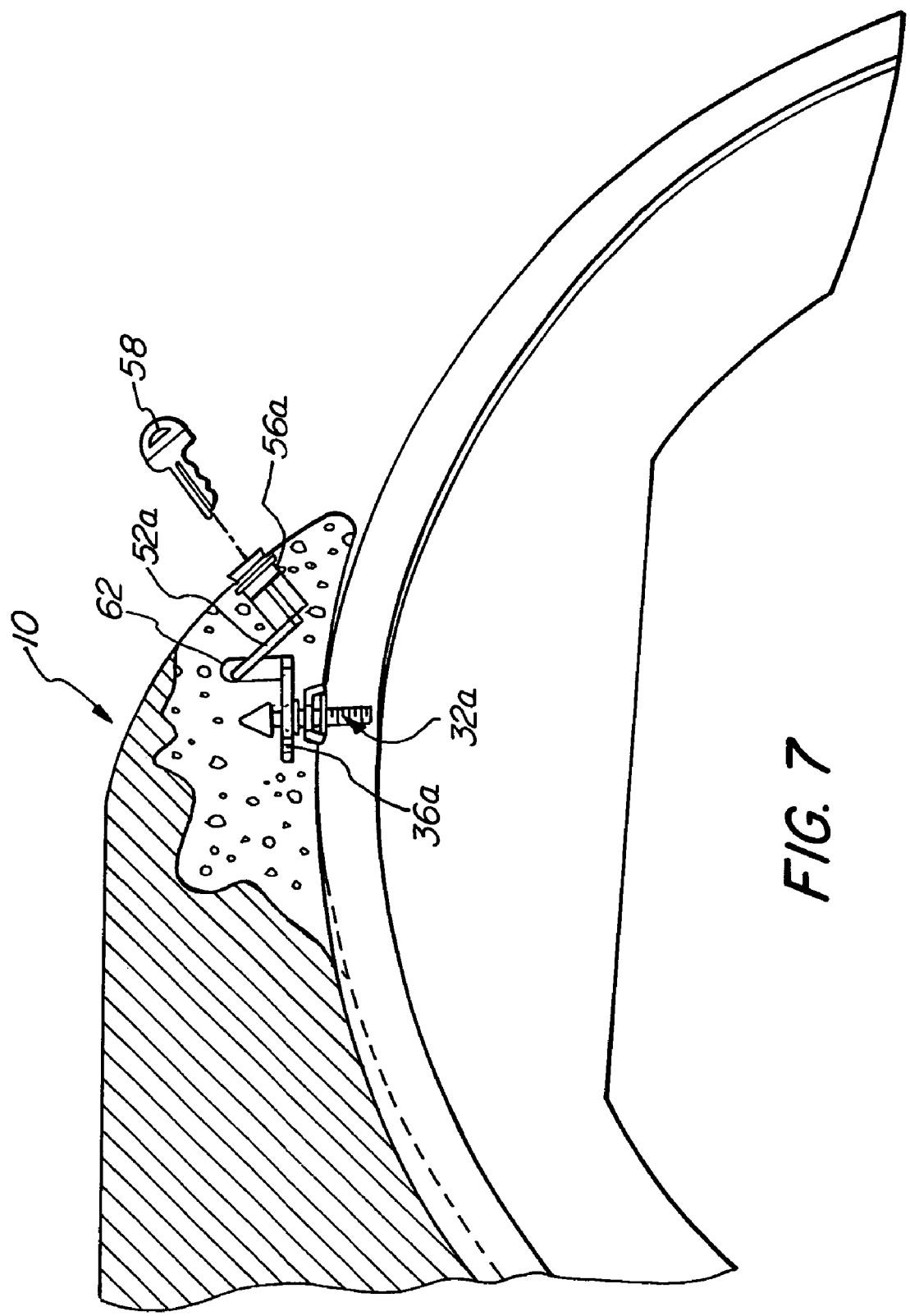
FIG. 7 is a schematic view of the locking assembly of FIG. 6.
Figure 8:
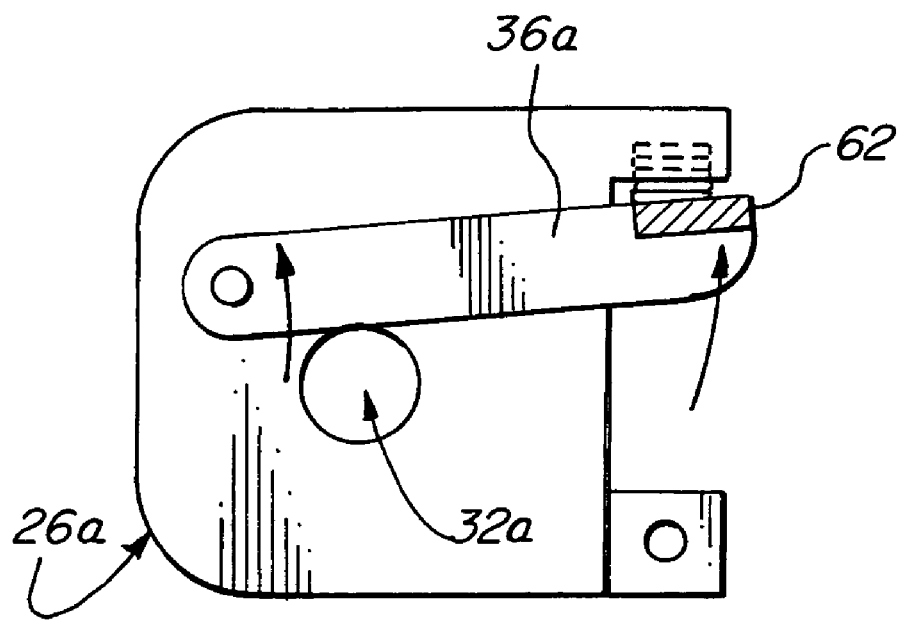
FIG. 8 is a schematic view showing the latch lever disengaged from the latch pin.
Figure 9:
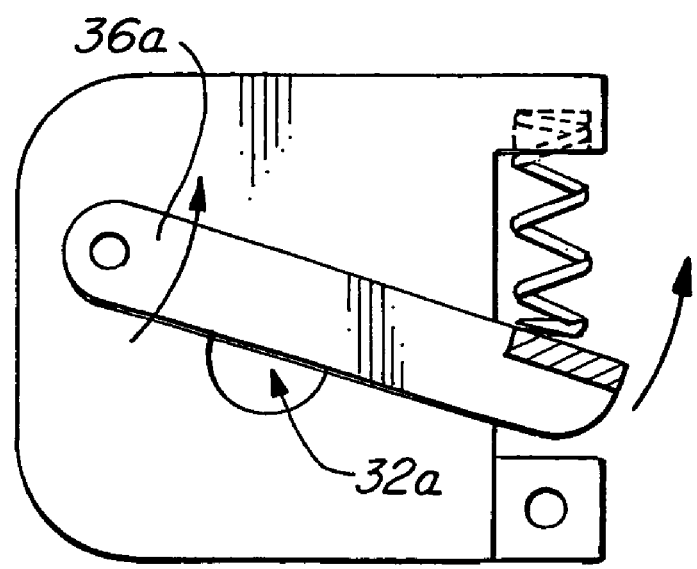
FIG. 9 is a similar view with the latch lever engaged.

In FIGS. 2 and 3, the key lock 56 is shown as mounted on the side of the seat 10. The pivoting of the latch lever 36 is effected by a flexible cable 50 which is attached at one end to the latch lever 36 and at its other end to the arm 52 on the rotatable shaft 54 in the key lock generally designated by the numeral 56. When the key 58 is rotated, the shaft 54 rotates and with it the arm 52. Rotation of the arm 52 is translated into motion of the cable 50 which pivots the end of the latch lever 36 against the biasing pressure of the spring 40 to disengage from a shoulder or collar 44 on the latch pin 32. The cable 50 is supported in guides 60 and the housing of the lock 56 has a portion projecting through the cover plate 22 (seen in FIG. 1) for insertion of the key 58 to effect its operation.

In this manner the seat can be locked in closed position but unlatched readily to pivot it about the hinges (not shown) to provide access to other components of the cycle below the saddle.

Turning next to FIGS. 6-9, therein illustrated is another embodiment of locking assembly. An upstanding arm 62n the outer end of the latch lever 36 as engageable by the rotatable actuator arm 52a of the key lock 56a. The arm 52a is mounted on the rotatable shaft 54a in the key lock 56a. When the key 58 is inserted into the lock 56 and rotated, the arm 52 pivots the latch lever 36 against the spring pressure to disengage it from the latch pin 32 so that the seat 10 may pivot and the latch pin 32 slides out of the passage.

In embodiment of FIGS. 6-9, the latch is mounted on the upper surface of the platform whereas it is mounted on the lower surface in the embodiment of FIGS. 2-5 which makes the embodiment of FIGS. 2-5 preferable for mounting on an existing seat or storage unit.

In both embodiments, the latching mechanism is the same and the key action the same. Another advantage to the embodiment of FIGS. 3-5 is that the key switch can be located at a more remote location which is easily reached by the flexible cable that is cut to the required length.

In the illustrated embodiments, the key lock is mounted in a cover plate at the rear of the seat and is relatively unobstructed. However, the key lock can be located in the side of the seat or storage structure or even in the upper surface of the seat since it is of small dimension. The preferred location will tend to be determined by the desired placement of the latch pin on the frame.

The use of two shouldered latch pins is preferable because there is a second stop in the event that the latch lever is unintentionally disengaged from the first shoulder.

The term "frame" as used herein refers to a rigid portion of the chassis which will securely seat the latch pin.

The components of the lock assembly can be fabricated easily and economically. The lock assembly can be factory installed or supplied as a kit for installation by the dealer or the owner.

Since only the key receiving portion of the lock assembly is visible, the appearance of the seat or storage structure is not materially altered.

From the foregoing detailed description and attached drawings, it can be seen that the lock assembly of the motorcycle of the present invention provides secure engagement to the frame and can be mounted in a variety of locations to retain a pleasing aesthetic appearance. The latch pin may be mounted on the frame and the latch housing can be mounted on the lower surface of the seat platform or storage unit. Moreover, the components may be fabricated readily and economically and they may be installed easily.

Having thus described the invention, what is claimed is:

1. In combination:
   (a) a motorcycle having a frame;
   (b) a structure to be mounted on said frame; and
   (c) a locking assembly for locking said structure on said frame including (i) a latch pin mounted on the motorcycle frame, (ii) a latch housing mounted on said structure and having a passage into which said latch pin extends, (iii) a latch lever pivotably mounted in said housing and pivotable into a latching position in which it engages said latch pin to prevent its retraction from the latch housing, biasing means biasing said latch lever into said latching position, a key lock mounted on the exterior of said structure and including a rotatable shaft, latch lever engaging means on said shaft engageable with said latch lever to effect its pivoting against the biasing action of said biasing means to disengage said latch lever from said latch pin and permit said structure to be disengaged from said latch pin, said latch pin having two frustoconical portions along its axial length which provide a pair of shoulders beneath which said latching lever is engageable.

2. The motorcycle in accordance wit claim 1 wherein said structure is a motorcycle seat having a base with lower surface upon which said latch housing is mounted.

3. The motorcycle in accordance with claim 2 wherein said seat is mounted on said frame to provide access to components therebelow pivotably and said locking assembly prevents such pivoting.

4. The motorcycle in accordance wit claim 1 wherein said structure is a storage unit having a base wall with a lower surface and on which said latch housing is mounted.

5. The motorcycle in accordance with claim 1 wherein said latch pin has a shoulder in its circumference and said latch lever engages below said shoulder in said latching position.

6. The motorcycle in accordance with claim 1 wherein said key lock has a housing in which said shaft is rotatable and a portion on an exterior surface of said structure containing a key receiving recess for rotation of said shaft between locked and unlatching positions.

7. The motorcycle in accordance with claim 1 wherein said lever is pivotably mounted adjacent one end and said latch lever engaging means is an arm mounted on said shaft for rotation therewith and engaging the other end of said latch lever to effect its pivoting in the opposite direction against the biasing actions of said biasing means.

8. In combination:
   (a) a motorcycle having a frame;
   (b) a seat mounted on said frame and having a base; and (c) a locking assembly for locking said structure on said frame including (i) a latch pin mounted on the motorcycle frame, (ii) a latch housing mounted on said base of said seat and having a passage into which said latch pin extends, (iii) a latch lever pivotably mounted in said latch housing and pivotable into a latching position in which it engages said latch pinto prevent its retraction from said latch housing, (iv) biasing means biasing said latch lever into said latching position, and (v) a key lock mounted on the exterior of said seat and including a housing disposed on the interior of said seat and a shaft rotatable in said housing, a key engageable in said key lock to lock said shaft in a first position and rotatable in said housing, latch lever engaging means on said shaft engaged with said latch lever and movable upon rotation of said shaft by said key to effect pivoting of said latch lever against the biasing action of said biasing means to disengage said latch lever from said latch pin and permit said seat to be disengaged from said latch pin, said latch lever is being pivotably mounted adjacent one end and said latch lever engaging means includes a cable connected to the other end of said latch lever and attached to said shaft so that rotation of said shaft by said key effects pivoting of said latch lever in the direction opposite the biasing action of said biasing means.

9. The motorcycle in accordance with claim 1 wherein said latch lever is pivotably mounted adjacent one end and said latch lever engaging means is an arm mounted on said key lock shaft for rotation therewith and engaging the other end of said latch lever so that rotation of said shaft by said key effects pivoting of said latch lever in the direction opposite that of the biasing action of said biasing means.

10. The motorcycle in accordance with claim 8 wherein said latch pin has a shoulder in its circumference and said latch lever engages below said shoulder in said latching position.

11. The motorcycle in accordance with claim 8 wherein latch pin has two frustoconical portions along its axial length which provide a pair of shoulders beneath which said latching lever is engageable, and wherein said biasing means is a compression spring acting against said latching lever at a point spaced from the axis of pivoting.

12. A locking assembly for releasably locking a motorcycle seat to the motorcycle frame, including:
   (a) a latch pin for mounting on the motorcycle frame;
   (b) a latch housing for mounting on the base of the motorcycle seat and having a passage into which said latch pin extends;
   (c) a latch lever pivotably mounted in said housing and pivotable into a latching position in which it engages said latch pin to prevent its retraction from the latch housing;
   (d) biasing means biasing said latch lever into said latching position; and
   (e) a key lack for mounting on the exterior of the seat and including (i) a rotatable shaft, and (ii) latch lever engaging means on said shaft engageable with said latch lever to effect its pivoting against the biasing action of said biasing means to disengage said latch lever from said latch pin and permit said structure to be disengaged from said latch pin, said latch pin having two frustoconical portions along its axial length which provide a pair of shoulders beneath which said latching lever is engageable, said biasing means is being a compression spring acting against said latching lever at a point spaced from the axis of pivoting.

13. The locking assembly in accordance wit claim 12 wherein said key lock has a housing in which said shaft is rotatable and a portion to be disposed on an exterior surface of said seat containing a key receiving recess for rotation of said shaft between locked and unlatching positions.

14. The locking assembly in accordance wit claim 12 wherein said latch lever is pivotably mounted adjacent one end and said latch lever engaging means is an arm mounted on said key lock shaft for rotation therewith and engaging the other end of said latch lever so that rotation of said shaft by said key effects pivoting of said latch lever in the direction opposite that of the biasing action of said biasing means.

15. The locking assembly in accordance with claim 12 wherein said latch lever is pivotably mounted adjacent one end and said latch lever engaging means includes a cable connected to the other end of said latch lever and attached to said shaft so tat rotation of said shaft by said key effects pivoting of said latch lever in the direction opposite the biasing action of said biasing means.

16. In combination:
   (a) a motorcycle having a frame;
   (b) a structure to be mounted on said frame; and
   (c) a locking assembly for locking said structure on said frame including (i) a latch pin mounted on the motorcycle frame, (ii) a latch housing mounted on said structure and having a passage into which said latch pin extends, (iii) a latch lever pivotably mounted in said housing and pivotable into a latching position in which it engages said latch pin to prevent its retraction from the latch housing, biasing means biasing said latch lever into said latching position, a key lock mounted on the exterior of said structure and including a rotatable shaft, latch lever engaging means on said shaft engageable with said latch lever to effect its pivoting against the biasing action of said biasing means to disengage said latch lever from said latch pin and permit said structure to be disengaged from said latch pin, said lever being pivotably mounted adjacent one end and said latch lever engaging means including a cable connected to the ocher end of said latch lever and attached to said shaft so tat rotation of said shaft effects pivoting of said latch lever in the opposite direction against the biasing action of said biasing means.

17. In combination:
   (a) a motorcycle having a frame;
   (b) a structure to be mounted on said frame; and
   (c) a locking assembly for locking said structure on said frame including (i) a latch pin mounted on the motorcycle frame, (ii) a latch housing mounted on said structure and having a passage into which said latch pin extends, (iii) a latch lever pivotably mounted in said housing and pivotable into a latching position in which it engages said latch pin to prevent its refraction from the latch housing, biasing means biasing said latch lever into said latching position, a key lock mounted on the exterior of said structure and including a rotatable shaft, latch lever engaging means on said shaft engageable with said latch lever to effect its pivoting against the biasing action of a compression acting against said latching lever at a point spaced from the axis of pivoting to disengage said latch lever from said latch pin and permit said structure to be disengaged from said latch pin.

* * * * *